United States Patent
Ognibene et al.

(10) Patent No.: US 6,515,383 B1
(45) Date of Patent: Feb. 4, 2003

(54) PASSIVE, PHASE-CHANGE, STATOR WINDING END-TURN COOLED ELECTRIC MACHINE

(75) Inventors: Edward J. Ognibene, Belmont, MA (US); Jerome Kiley, Boston, MA (US)

(73) Assignee: SatCon Technology Corporation, Cambridge, MA (US)

(*) Notice: Subject to any disclaimer, the term of this patent is extended or adjusted under 35 U.S.C. 154(b) by 60 days.

(21) Appl. No.: 09/706,961

(22) Filed: Nov. 6, 2000

(51) Int. Cl.[7] .................................................. H02K 9/00
(52) U.S. Cl. ........................................... 310/52; 310/54
(58) Field of Search ................................ 310/52, 54, 64

(56) References Cited

U.S. PATENT DOCUMENTS

| | | | |
|---|---|---|---|
| 2,643,282 A | 6/1953 | Greene | 174/15 |
| 2,722,616 A | 11/1955 | Moses | 310/54 |
| 2,985,707 A | 5/1961 | Ahearn et al. | 174/15 |
| 3,014,139 A | 12/1961 | Shildneck | 310/54 |
| 3,024,298 A | 3/1962 | Goltsos et al. | 174/15 |
| 3,188,833 A | 6/1965 | Robinson | 62/505 |
| 3,201,728 A | 8/1965 | McWhirter | 336/60 |
| 3,294,991 A * | 12/1966 | Ward et al. | 310/54 |
| 3,417,814 A | 12/1968 | Oktay | 165/105 |
| 3,541,487 A | 11/1970 | Leonard | 336/58 |
| 3,614,693 A | 10/1971 | Frey III | 336/58 |
| 3,626,080 A | 12/1971 | Pierce | 174/15 R |
| 3,663,848 A * | 5/1972 | Lehoczky | 310/178 |
| 3,710,156 A | 1/1973 | Laing | 310/54 |
| 3,715,610 A * | 2/1973 | Brinkman | 165/104.25 |
| 3,818,983 A | 6/1974 | Grandia | 165/105 |
| 3,838,947 A * | 10/1974 | Laing | 165/104.21 |
| 3,851,221 A | 11/1974 | Beaulieu et al. | 317/100 |
| 3,906,261 A | 9/1975 | Ogura et al. | 310/12 |
| 4,009,417 A | 2/1977 | Waldon et al. | 361/34 |
| 4,027,728 A | 6/1977 | Kobayashi et al. | 165/105 |
| 4,573,324 A * | 3/1986 | Tischer et al. | 310/64 |
| 4,833,567 A | 5/1989 | Saaski et al. | 361/385 |
| 4,903,497 A * | 2/1990 | Zimmern et al. | 62/113 |
| 4,908,757 A | 3/1990 | Jensen et al. | 363/141 |
| 5,099,908 A | 3/1992 | Taraci et al. | 165/1 |
| 5,195,577 A | 3/1993 | Kameda et al. | 165/104.13 |
| 5,349,499 A | 9/1994 | Yamada et al. | 361/700 |
| 5,412,536 A | 5/1995 | Anderson et al. | 361/700 |
| 5,463,872 A | 11/1995 | Vader et al. | 62/51.1 |
| 5,688,398 A | 11/1997 | Jacquelin et al. | 210/167 |
| 6,009,722 A * | 1/2000 | Choi et al. | 310/54 |

FOREIGN PATENT DOCUMENTS

| | | | | |
|---|---|---|---|---|
| RU | 1372500 A | * | 2/1988 | H02K/09/20 |
| SU | 551763 | | 3/1977 | |
| SU | 636745 | | 12/1978 | |
| SU | 636745 A | * | 12/1978 | H02K/09/20 |

* cited by examiner

*Primary Examiner*—Joseph Waks
(74) *Attorney, Agent, or Firm*—Dike, Bronstein, Roberts & Cushman Intellectual Property Practice Group; George W. Neuner; George W. Hartnell, III

(57) ABSTRACT

A device and method for substantially enhancing the cooling of electric machines, e.g., motors and generators, is described. A hermetically-sealed chamber surrounds electric wire winding end-turns at either end of the stator core, and contains at least one phase-change coolant. The coolant removes heat from the stator winding through the end-turns, where often temperatures are the greatest, through cyclical ebullition, whereby heat generated by the stator winding end-turns boils and, subsequently, vaporizes the liquid coolant. The hot, vaporized coolant is removed through at least one vapor return passage and collects, cools, and condenses on the stator cooling jacket, which removes heat from the vaporized coolant. The liquid condensate precipitates into a wicking matrix, which continuously returns the liquid condensate through capillarity to the liquid coolant pool that partially wets the wicking matrix and winding end-turns. Addition of a passive, phase-change cooling system at the stator winding end-turns substantially enhances cooling the machine, which can reduce the size, weight, and cost of machines, especially, e.g., linear-, switch reluctant-, variable reluctant-, induction-, rotary-, and permanent magnet-type machines, and can provide greater efficiency of operation, lower cost per power unit, and increased power density.

30 Claims, 2 Drawing Sheets

PASSIVE, PHASE-CHANGE, STATOR WINDING END-TURN COOLED ELECTRIC MACHINE

STATEMENT REGARDING FEDERALLY-SPONSORED RESEARCH

This invention was made with Government support under Contract No. DASG60-97-M-0099 awarded by the United States Army Space and Strategic Defense Command. The Government has rights in the invention.

FIELD OF INVENTION

The present invention relates to a device and a method for substantially enhancing the cooling of electric machines, e.g., motors and generators, to provide greater power density and greater efficiency and, more particularly, to a device and a method for passively cooling the stator winding end-turns of an electric machine by ebullition, which is to say, by the cyclical process of evaporization and condensation of a coolant.

BACKGROUND OF THE INVENTION

Conventional cooling of electric machines, e.g., motors and generators, especially induction-type machines, typically involves a coolant-filled, highly conductive, outer cooling jacket, which encases the stator backiron element. In such systems, heat passes through the stator backiron in a radial path to the cooling jacket, which contains a fluid passage, e.g., a plurality of channels or tubes, through which cooling liquid flows. The cooling jacket, typically, is fabricated out of highly conductive material, e.g., aluminum. As additional measures, axial fans and oil fed through the rotor element may also be used to cool the machine. Such a system, however, overlooks the winding end-turns, where temperatures sometime are the highest—depending on the machine topology and application. This is particularly true for stator winding end-turns. Consequently, heat from the stator winding end-turns travels first to the stator backiron and then to the cooling jacket. Such a scheme is not an efficient means of transferring heat from the highest heat-producing source in the machine.

It is well known to those skilled in the art that conventional electric machines and other electrical devices can be cooled by ebullition. Indeed, for a conventional induction machine, heat produced in the stator core routinely is transmitted to a heat sink or cooling jacket by phase change cooling. See, for example, U.S. Pat. No. 3,710,156. Phase change cooling systems typically are passive; no additional energy input is required for the cooling system to function. Such systems conceptually are simple. Conventional phase-change cooling systems, however, also overlook providing a direct thermal link between the high temperatures generated at the stator winding end-turns and the cooling jacket.

Currently, there exists a need for an economical electrical machine that provides greater power density (measured in terms of kilowatts per kilogram (kW/kg)) at a lower cost (measured in terms of dollars per kilowatt ($/kW)). State-of-the-art high-performance induction machines have pushed power density to approximately 1.0 kW/kg and a cost per unit power to at least $8/kW.

One method for obtaining these objects of greater power density and lower cost is by lowering the overall thermal resistance of the electric machine. By doing this, either the density of the electrical current in the wires can be increased for a given winding temperature, or the winding temperature can be decreased for a given electrical current in the wires. The former leads to smaller motor size and weight for a given motor output, which translates into greater power density and lower cost. The latter reduces input power for a given output power, which leads to lower cost.

Thus, a solution to the shortcomings of the prior art is reducing the weight of conventional machines by providing a more efficient means of cooling the machine where the temperature gradients typically are the highest, i.e., in the stator winding, particularly in the end-turns.

In this setting, it would be desirable to provide a method of and a device for if cooling an electric machine that provides greater power density at a lower per unit power cost. Furthermore, it would be particularly desirable to provide such a method and device that reduce the size and weight of the machine in comparison to prior art devices.

SUMMARY OF THE INVENTION

The present invention features a method of and a device for substantially enhancing the cooling of a machine that is made more efficient by hermetically enclosing the stator, including the winding end-turns, and partially wetting them in a liquid, phase-change coolant or mixture of phase-change coolants, which flows in a self-sufficient thermodynamic cycle between the winding end-turns and a conventional cooling jackets. The liquid phase-change coolant boils and evaporates as the coolant absorbs heat generated by the inefficiencies of the machine stator end-turns. The hot, vaporized coolant collects at a cooling jacket where it cools and condenses. As the vaporized coolant condenses, heat is transferred, or rejected, to the cooling jacket, which contains water, refrigerant or some other heat-transferring coolant. The liquid condensate precipitates into a wicking matrix, which provides a liquid flow path for delivering the condensed liquid back to the winding end-turns. Capillary pressure head, or "capillarity", created by surface tension at the liquid-vapor interface in the winding end-turns provides the pressure head to pump the flow. The phase change cycle then repeats itself.

In comparison to typical prior art electric machines, by providing phase-change cooling at the winding end-turns in accord with preferred embodiments of the present invention, the machine mass can be reduced preferably by at least about 33 percent, thereby preferably providing at least about a 50 percent increase in power density. Moreover, the cost per unit power preferably can be reduced by at least about 20 percent and most likely more. Hence, electric machines can be provided with greater power density and greater efficiency more economically.

Preferred embodiments of the present invention provide a smaller, lighter, and more economical electric machine.

Certain preferred embodiments of the present invention can provide increased electrical current, ergo power density in an electric machine.

Additionally, preferred embodiments of the present invention can provide improved operating efficiency of an electric machine.

Thus, the present invention provides an electric machine comprising winding end-turns and having at least one hermetically sealed chamber surrounding the winding end-turns. The winding end-turns, which are bundles of wires that are wound into and out of slots in the stator armature and that extend axially from the armature, are partially wetted in a phase-change coolant. The liquid, phase-change coolant boils and vaporizes at or near the desired operating temperature of the winding end-turns. The vaporized coolant exits the end-turn windings and travels to a conventional, highly-conductive cooling jacket, which preferably also serves as a heat sink for the stator backiron. At the cooling jacket, the coolant vapor cools, thereby rejecting heat to the cooling jacket, and condenses on the inside of the cooling jacket. The liquid condensate coalesces into a wicking matrix, which is located around the winding end-turns and between the winding end-turns and the cooling jacket. The interaction between the solid winding end-turns, the coolant by liquid, the coolant vapor and the interface between the coolant liquid and the coolant vapor results in a pressure head by capillarity that provides liquid coolant to the winding end-turns when and as needed.

Other aspects and embodiments of the invention are discussed below. Moreover, additional advantages of the present invention are apparent from the drawings and specifications that follow.

BRIEF DESCRIPTION OF THE DRAWING

For a fuller understanding of the present invention, reference is made to the following detailed description taken in conjunction with the accompanying drawing figures wherein like reference characters denote corresponding parts throughout the several views and wherein.

DETAILED DESCRIPTION OF THE INVENTION INCLUDING THE PREFERRED EMBODIMENTS

Figure 1:
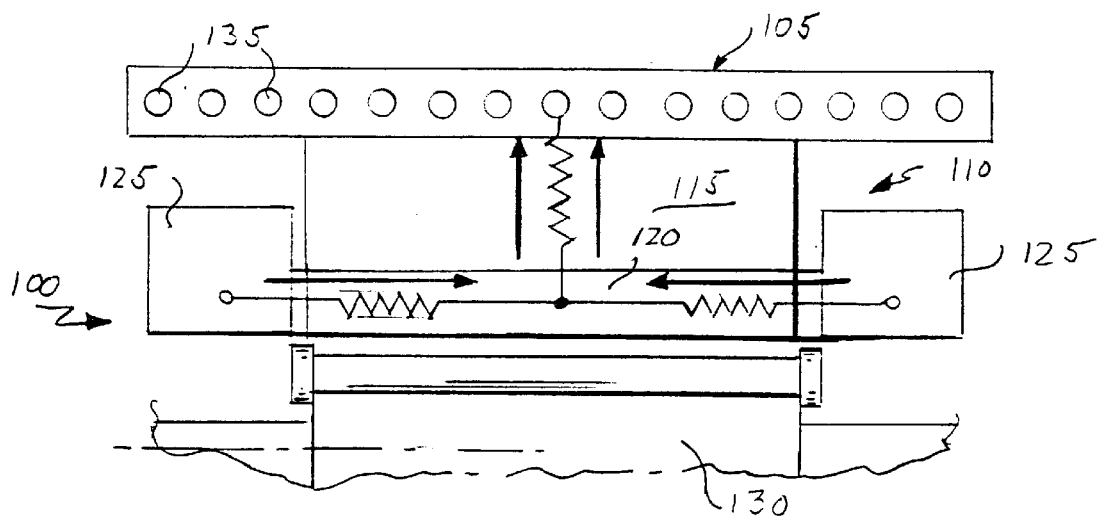
FIG. 1 illustrates an embodiment of a conventional electric machine cooling system.

Referring now to the various figures of the drawing wherein like reference characters refer to like parts, there is shown in FIG. 1 an embodiment of a conventional cooling system for an electric machine, which, for illustrative purposes only, is shown as a rotary motor 100. However, it should be noted at the onset that the present invention can be practiced on virtually any machine having end-turn windings, e.g., a rotary-type machine, a linear-type machine, a permanent magnet (PM)-type machine, a switch reluctant- or variable reluctant-type machine, etc.

The rotary motor 100 depicted in FIG. 1 has a cooling jacket 105, a stator 110 comprising a stator backiron, or armature, 115, a plurality of stator slots 120, through which pass a plurality of, e.g., copper or aluminum windings, winding end-turns 125, and a rotor 130. The cooling jacket 105, which encases the stator backiron 115, typically is constructed from a highly conductive material, e.g., aluminum, and provides a series of channels or tubes 135 through which a cooling liquid flows. In this cooling system, the primary thermal transfer or heat flow path is radially from the stator 110 to the channels or tubes 135 through the backiron 115 and the cooling jacket 105. Most of the heat generated at the winding end turns 125, where heat is the greatest, passes to the channels or tubes 135 after successively passing through the stator slots 120, the stator backiron 115, and the cooling jacket 105. The thermal transfer from the winding end-turns 125 is very inefficient due to the heat flow path, which includes heat transfer through the slot liner. The present invention eliminates this inefficiency, providing a more direct heat flow path from the winding end-turns 125 and the channels or tubes 135 in the cooling jacket 105.

Figure 2:
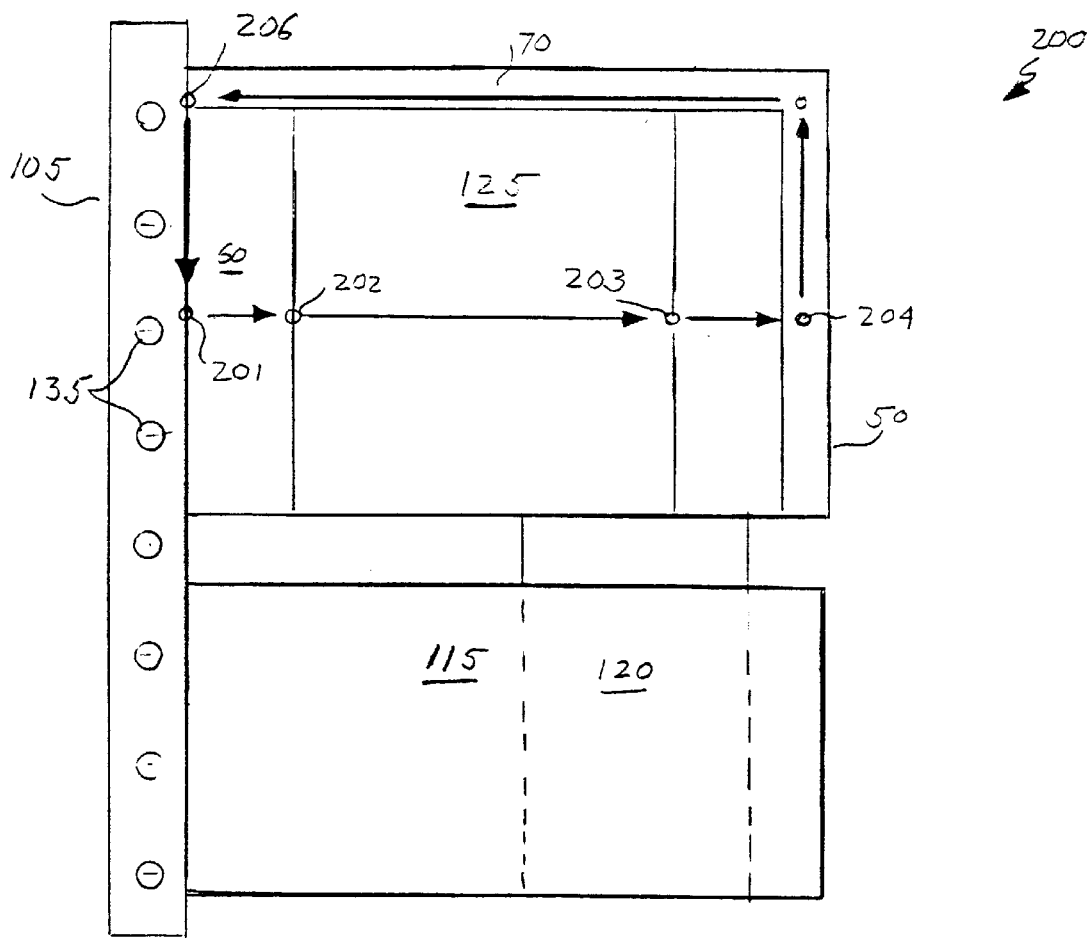
FIG. 2 illustrates a fluid circuit diagram for an end-turn cooling system in accord with the present invention.

The flow cycle 200 of coolant for an embodiment of the passive, phase-change end-turn cooling system 10 in accord with the present invention is shown in FIG. 2. At point 201, the vaporized phase-change coolant condenses on the inner surface of the cooling jacket 105. At point 201, the liquid coolant coalesces into a wicking matrix 60, which is situated between the cooling jacket 105 and the winding end-turns 125. Between point 201 and point 203, capillary head pressure feeds the liquid coolant onto and between the winding end-turns 125, where the liquid coolant is brought to its boiling point as heat from the winding end turns 125 is absorbed by the liquid. Between point 203 and point 204, the liquid coolant absorbs more heat generated by the winding end-turns 125 and vaporizes. Between point 204 and point 206, the vaporized coolant passes through passages 50 to flow to the cooling jacket 105. At point 206, the coolant vapor contacts the inner surface of the cooling jacket 105. At the inner surface of the cooling jacket 105, exterior coolant flowing through the channels or tubes 135 of the cooling jacket 105 absorbs heat from the condensing coolant vapor. Between point 206 and point 201, sufficient heat is removed from the coolant vapor to cause it to condense, i.e., to return to a liquid state, on the inner surface of the cooling jacket 105. At point 201, the cycle described above begins again.

Figure 3:
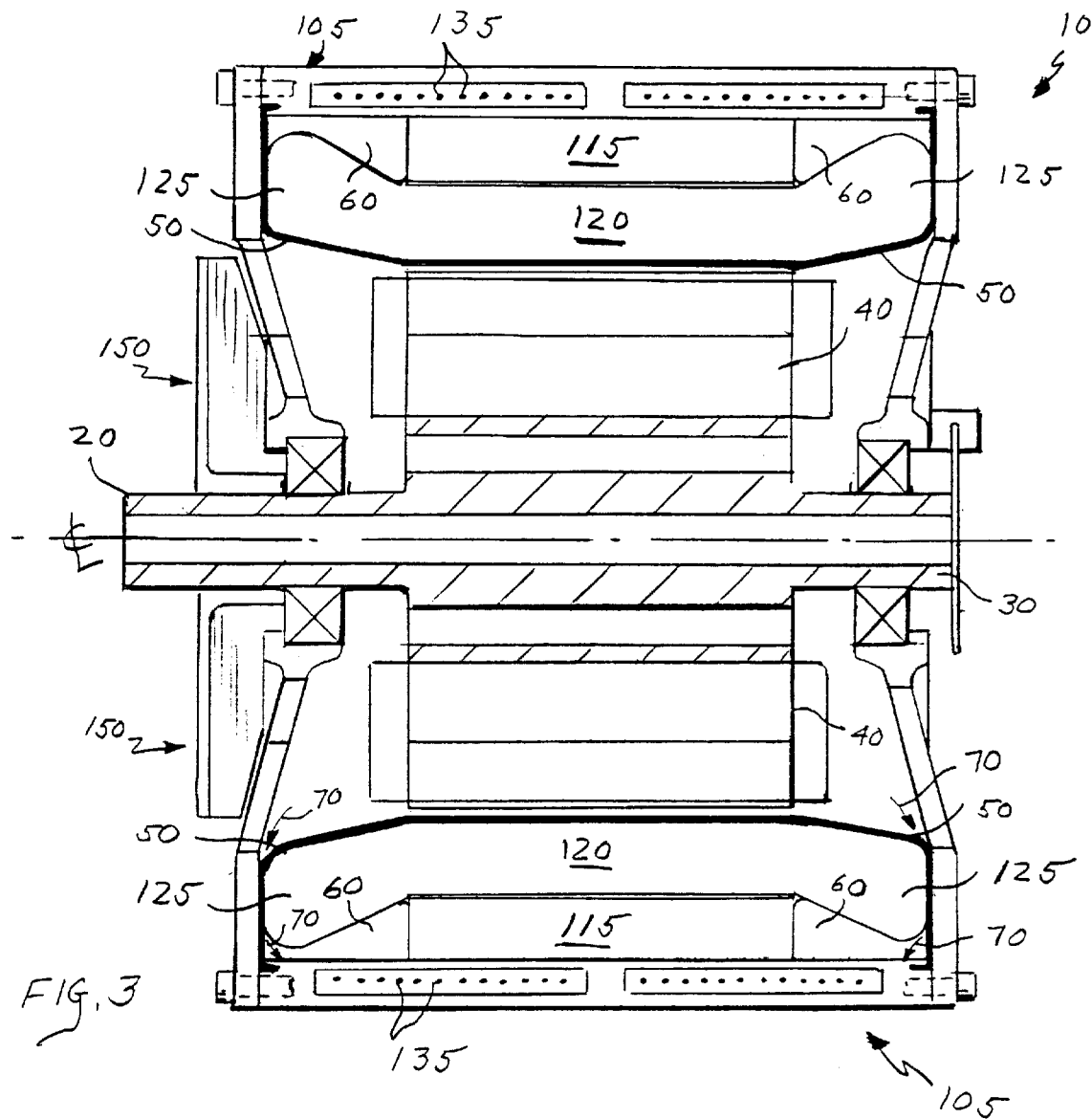
FIG. 3 illustrates an embodiment of a passive, phase-change cooling system for an electric machine in accord with the present invention.

In FIG. 3 is shown an embodiment of a passive, phase-change, end-turn cooling system 10 for a motor in accord with the present invention. In this embodiment, an electrical induction-type motor 20 is illustrated; however, this disclosure is merely as an example and is not intended to limit the practice of this invention to an electrical induction motor 20. Indeed, those skilled in the art can practice the methods disclosed herein on virtually any machine that has electric winding end-turns 125, e.g., linear-type machines, PM-type machines, etc.

The electrical induction machine 20 depicted in FIG. 3, which is axisymmetric about a centerline C/L, comprises a rotor shaft 30, a rotor backiron 40, a cooling jacket 105, cooling jacket channels or tubes 135, a stator backiron 115, a slot for windings 120, and winding end-turns 125. The passive, phase-change end-turn cooling system 10 further comprises a coolant chamber shell 50, which contains at least one phase-change coolant, at least one vapor flow passage 70, and a wicking matrix 60. If the machine topology or application would benefit from it, a fan 150 also can be used to provide additional cooling for the bearings and rotor shaft 30.

A preferred passive, phase-change end-turn cooling system 10 consists of a steel, axially-slotted armature 115, which has a plurality of armature slots 120 that are filled with, e.g., copper, aluminum or other conductive wire bundles. These wire bundles are wound into and out of the plurality of armature slots 120. Winding end-turns 125 extend axially from the armature 115, forming a repetitive circumferential pattern.

The packing factor of the winding end-turns 125, which may or may not be the same as the packing factor of wire bundles in the armature slot 120, is an important parameter in practice of preferred embodiments of this invention. Indeed, as will be described in greater detail below, the winding end-turns 125 themselves preferably contribute to the wicking action in the device. The packing factor of wire bundles in a single armature slot 120 is defined as a ratio of wire volume (including wire insulation and coating) in the armature slot 120 to the total volume of the armature slot 120. Capillary head pressure, which also will be discussed in greater detail below, is proportional to the packing factor. Hence, the higher the packing factor, which is to say, the denser the wire volume with respect to the slot volume, the higher the capillarity. A packing factor between about 0.25 and about 0.50 typically provides acceptable results; however, higher packing factors are preferred. The invention can be practiced with lower packing factors for the end-turns, however, the role of the wicking matrix can become increasingly more important.

Capillarity, in this type of system is approximately inversely proportional to the diameter of the wire. Hence, generally speaking, the smaller the wire diameter the greater the capillary pressure head. Insulating the wires with an additional layer of bonded insulation has an effect on the capillarity of the winding end-turns 125. Also, varnished wires and certain wire coatings, which provide rigidity to hold the windings in the armature slots 120 firmly, can increase capillarity. Thus, small diameter wires with certain coatings or varnishes can produce greater capillarity than larger diameter wires. However, capillarity ultimately depends on the resulting porosity and average wire diameter.

For effective cooling, the winding end-turns 125 are partially immersed, or wetted by a liquid coolant. Typically, the liquid coolant can wet between about 5 to about 80 percent of the surface area of the winding end-turns 125 at any given time. Many working fluids can be used as phase-change coolants. Indeed, properties most desirable for a liquid coolant include high electrical resistivity, high heat of vaporization, excellent dielectric properties, and relative inertness with respect to machine materials. Preferred end-turn coolants for the practice of the present invention are perfluorinated fluids, such as certain FLUORINERT® liquids manufactured by 3M, e.g., FLUORINERT® FC-75 or FC-104, and other similar non-electrically conductive fluids are ideally suited as phase-change coolants.

The winding end-turns 125 and phase-change coolant are hermetically sealed in a chamber shell 50, wherein the phase change coolant is in direct communion with the cooling jacket 105. In a preferred embodiment, the chamber shell 50 is made of 300-series stainless steel approximately 0.030-inch thick, that is rounded; however, the invention can be practiced using alternative shapes, materials, and thicknesses without deviating from the spirit of the invention. The chamber shell can be attached in manners that are well known to those of ordinary skill in the art, which include, without limitation, by press-interference fit, welding, bolting, epoxy, and adhesion.

During machine operation, as current flows through the, e.g., copper wire, internal impedance of the wire causes the windings to heat up. As the temperature of the winding end-turns 125 reaches or exceeds the boiling or vaporization temperature of the phase-change coolant—typically between 80 and 155 degrees Centigrade to accommodate the wire insulation—the coolant evaporates. It should be noted that rarely does the machine operate without both phases (liquid and vapor) present in the coolant. The coolant vapor follows at least one vapor flow passage 70 preferably through the wicking matrix to the cooling jacket 105.

At the inner surface of the cooling jacket 105, heat from the vaporized phase-change coolant (internal coolant) is rejected to the cooling jacket coolant (external coolant), which flows through a plurality of cooling channels and tubes 135. As heat is removed from the internal coolant vapor, the internal coolant condenses on the inner surface of the cooling jacket 105, which is in direct communion with a wicking matrix 60.

The wicking matrix 60 comprises a plurality of small beads, pellets or particles that, in one preferred embodiment, is encased in a flexible material, e.g., a net, bag or sock. In additional embodiments, the wicking matrix 60 comprises a porous flexible material, e.g., a mesh, felt, or woven material, or an open cell, porous resilient material, e.g., a cellular sponge, which is situated between and against the winding end-turns 125 and the cooling jacket 105. The wicking matrix 60 provides a path for distributing the liquid condensate continuously to the winding end-turns 125.

The wicking matrix 60 provides some additional capillary pressure head as a function of its thermal conductivity. The greater the thermal conductivity of the wicking matrix 60, the more the wicking matrix 60 contributes to the total capillary head pressure. Indeed, the more heat conducted by the wicking matrix 60, the more the matrix 60 contributes to the ebullition process, i.e., the more the liquid coolant evaporates. As the liquid coolant evaporates, escaping coolant vapors draw in more liquid coolant, which produces a greater pressure head from the menisci of the liquid coolant. Ideally, materials selected for the wicking matrix 60, e.g., AlN, provide 20 substantial thermal conductivity with minimal electrical conductivity.

Larger beads, pellets or particles reduce liquid pressure drop as the liquid flows through the wicking matrix 60. However, if the beads, pellets or particles are too large, then there can be insufficient capillarity in the fluid path to provide continuous flow to the winding end-turns 125. Spherical beads, pellets, and particles with an average equivalent diameter of about 0.010 to 0.030 inch are preferred, however, other size and non-spherical shaped beads, pellets, and particles are suitable as long as the desired flows for vapor and liquid are accommodated in the particular geometry. In a preferred embodiment, smooth beads of approximately 0.020-inch diameter provide the fluid flow requirements.

The flexible netting, woven material, felt or sponge preferably is a nonconductor of electricity and is able to withstand high temperature without serious loss of strength or integrity. Thus, the flexible material can be, e.g., a mesh or wrap. In an alternate embodiment, adhesives also can be used in place of a mesh or wrap to maintain the integrity of the wicking matrix 60. With this adhesive embodiment, each beads, pellets or particles would be adhered to a plurality of neighboring beads, pellets or particles at the points of contact. The matrix 60, in this embodiment, remains relatively open for the liquid coolant and coolant vapor to pass through.

Heat conduction through the wicking matrix 60 may be low in which case the wicking matrix beads, pellets or particles preferably are lightweight, inexpensive, and have good dielectric properties, and low abrasivity to minimize damage to the winding end-turns 125. In a preferred embodiment, smooth, rounded, beads, pellets or particles of aluminum oxide are used as the wicking matrix 60; however, various other materials, shapes, and sizes are useful in the practice of the present invention. For example, as a cheaper alternative, glass, ceramic, plastic, zirconium oxide, or composite beads, pellets or particles can be used. Indeed, any dielectric material can be used.

Surface tension effects at the liquid/vapor interface produce capillary pressure head in the winding end-turns 125.

Figure 4:
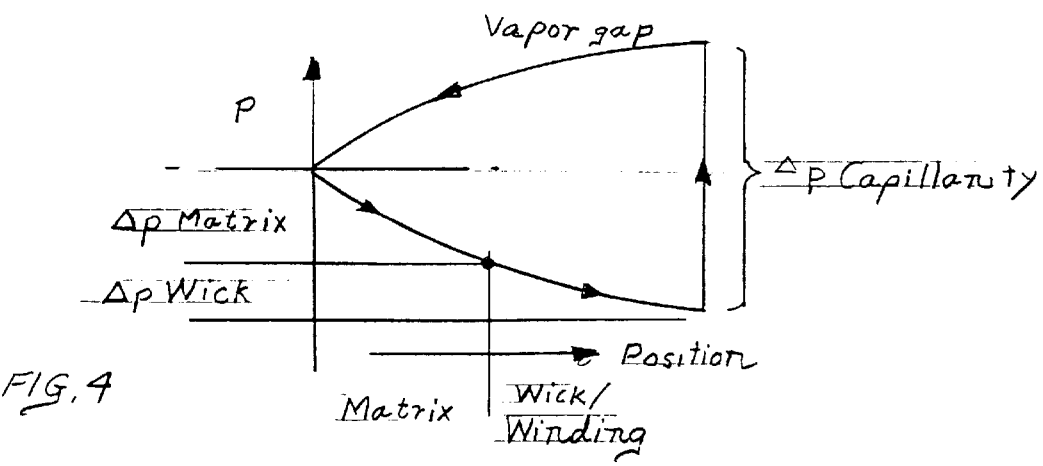
FIG. 4 illustrates the relationship between changes in capillarity pressure versus position.

Indeed, as liquid coolant boils and evaporates, the vapor pressure/liquid coolant interface substantially establishes the level of the liquid condensate in the wicking matrix 60, which partially wets the winding end-turns 125. The interaction between the winding end-turns 125 and the liquid and vaporized coolant elements further affects the available capillary pressure head. Indeed, the packing factor can range typically from about 0.25 to about 0.50 or higher. As the vaporized coolant passes through at least one vapor return passage 70 to the cooling jacket 105, the pressure drops, drawing the liquid condensate into the winding end-turns 125 and the two-phase process begins again. See FIG. 4 for an illustration of pressure, i.e., capillarity, change as a function of position in the wicking material and end-turn windings. As FIG. 4 shows, the total capillarity pressure change ($\Delta P_{CAPILLARITY}$) comprises the pressure change due to the wicking matrix 60 ($\Delta P_{MATRIX}$), pressure change due to the winding end-turns 25 and the beads, pellets, and particles ($\Delta P_{WICK}$), and pressure change due to the expanding vapor (vapor gap).

The invention has been described in detail including preferred embodiments thereof. However, such description is for illustrative purposes only, and it is to be understood that those skilled in the art may make changes and variations without departing from the spirit or scope of the invention as set forth in the following claims.

What is claimed is:

1. An electric machine comprising a rotor, a stator and a cooling jacket, the stator comprising an armature, a plurality of stator windings that pass through a plurality of stator slots, producing a plurality of stator winding end-turns at a distal end of the armature and a plurality of stator winding end-turns at a proximal end of the armature, wherein the machine further comprises:
   a hermetically-sealed chamber surrounding the stator winding end-turns;
   at least one phase-change internal coolant within the hermetically-sealed chamber, the internal coolant having a liquid phase and a vapor phase;
   a wicking means comprising
      the plurality of stator winding end-turns and
      a wicking matrix disposed between the cooling jacket and said stator winding end-turns to provide wicking action; and
   means for vapor return.

2. An electric machine as recited in claim 1, wherein the machine is selected from the group consisting of linear-, switch reluctant-, variable reluctant-, induction-, permanent magnet-, and rotary-type electrical motors and generators.

3. An electric machine as recited in claim 1, wherein the chamber is made of stainless steel.

4. An electric machine as recited in claim 3, wherein the stainless steel is about 0.030 inch thick.

5. An electric machine as recited in claim 1, wherein the chamber is fixedly connected to the machine cooling jacket.

6. An electric machine as recited in claim 1, wherein the phase-change coolant is a non-electrically conductive fluid.

7. An electric machine as recited in claim 6, wherein the non-electrically conductive fluid is a perfluorinated liquid.

8. An electric machine as recited in claim 1, wherein the liquid phase-change coolant partially wets at least a portion of the stator winding end-turns.

9. An electric machine as recited in claim 8, wherein a percentage of stator winding end-turns wet by the liquid phase-change coolant is about 5 to about 80 percent.

10. An electric machine as recited in claim 1, wherein the wicking matrix comprises a plurality of beads, pellets, and/or particles.

11. An electric machine as recited in claim 10, wherein the plurality of beads, pellets, and/or particles is selected from the group consisting of aluminum oxide, zirconium oxide, ceramic, plastic, glass, and composite materials.

12. An electric machine as recited in claim 11, wherein the beads, pellets, and/or particles have an equivalent diameter of about 0.010 to about 0.030 inch.

13. An electric machine as recited in claim 12, wherein the beads, pellets, and/or particles have an equivalent diameter of about 0.020 inch.

14. An electric machine as recited in claim 1, wherein the wicking matrix comprises a flexible material surrounding beads, pellets, and/or particles.

15. An electric machine as recited in claim 14, wherein the flexible material is selected from a group consisting of a net, a sock, and a bag.

16. An electric machine as recited in claim 1, wherein the wicking matrix comprises material selected from a group consisting of a porous flexible material, a woven material, a mesh, felt, an open cell, porous resilient material, and a cellular sponge.

17. An electric machine as recited in claim 1, wherein the wicking matrix comprises a plurality of beads, pellets and/or particles that are adhesively attached to each other with pathways therein.

18. An electric machine as recited in claim 1, wherein the plurality of stator winding end-turns comprises a bundle of at least one of insulated, coated and varnished wire.

19. A method for passively cooling an electric machine, which machine comprises a cooling jacket and a stator that, further, comprises an armature, a plurality of stator windings, which pass through a plurality of stator slots, a plurality of stator winding end-turns at a distal end and a proximal end of the armature, comprising the steps:
   hermetically encasing the plurality of stator winding end-turns in a chamber;
   wetting the plurality of stator winding end-turns partially in a liquid coolant;
   heating the liquid coolant to a boiling point to produce a vaporized coolant;
   transporting the vaporized coolant through at least one vapor flow passage to the cooling jacket;
   condensing the vaporized coolant at the cooling jacket, wherein the condensed, vaporized coolant becomes a liquid condensate as heat is transferred from the vaporized coolant to the cooling jacket;
   collecting the liquid condensate in a wicking matrix, wherein the wicking matrix includes the plurality of stator windings end-turns; and
   replenishing the liquid coolant at the end-turns by passing the condensate through the wicking matrix.

20. A method of passively cooling an electric machine as recited in claim 19, comprising wetting from about 5 to about 80 percent of the stator winding end-turns in the liquid coolant.

21. A method of passively cooling a machine as recited in claim 19, comprising providing as the liquid coolant a non-electrically conductive material.

22. A method of passively cooling a machine as recited in claim 21, comprising providing a perfluorinated fluid.

23. A method of passively cooling a machine as recited in claim 19, comprising providing a wicking matrix comprising a plurality of beads, pellets, and/or particles.

24. A method of passively cooling a machine as recited in claim 23, wherein the plurality of beads, pellets, and/or particles is selected from the group consisting of aluminum oxide, zirconium oxide, ceramic, plastic, glass, and composite materials.

25. A method of passively cooling a machine as recited in claim 24, comprising providing beads, pellets, and/or particles having an average equivalent see diameter of about 0.010 to 0.030 inch.

26. A method of passively cooling a machine as recited in claim 25, comprising providing beads, pellets, and/or particles having an average equivalent diameter of about 0.020 inch.

27. A method of passively cooling a machine as recited in claim 19, comprising providing a wicking matrix comprising a flexible material surrounding a plurality of beads, pellets, and/or particles.

28. A method of passively cooling a machine as recited in claim 27, wherein the flexible material is selected from a group consisting of a net, a sock, and a bag.

29. A method of passively cooling a machine as recited in claim 19, comprising providing a wicking matrix, wherein the wicking matrix comprises material selected from a group consisting of a porous flexible material, a woven material, a mesh, felt, an open cell, porous resilient material, and a cellular sponge.

30. A method of passively cooling a machine as recited in claim 19, comprising providing a wicking matrix comprising a plurality of beads, pellets and/or particles that are adhesively attached to each other with pathways therein.

* * * * *